United States Patent [19]

DeYoreo et al.

[11] Patent Number: 4,519,776

[45] Date of Patent: May 28, 1985

[54] APPARATUS FOR ATTRACTING INSECTS

[75] Inventors: Sal G. DeYoreo, Andover; David P. Stevens, Billerica, both of Mass.

[73] Assignee: Armatron International, Inc., Melrose, Mass.

[21] Appl. No.: 511,971

[22] Filed: Jul. 8, 1983

[51] Int. Cl.³ .............................................. F23D 13/00
[52] U.S. Cl. ...................................... 431/328; 431/75; 431/268; 251/11
[58] Field of Search .................... 431/328, 75, 268, 12, 431/344; 251/11

[56] References Cited

U.S. PATENT DOCUMENTS

| 1,281,300 | 10/1918 | Cross | 431/328 |
|---|---|---|---|
| 2,073,448 | 3/1937 | Fruth et al. | 431/268 |
| 2,921,176 | 1/1960 | Scofield | 219/37 |
| 3,029,802 | 4/1962 | Webster | 431/328 |
| 3,229,956 | 1/1966 | White | 251/11 |
| 3,759,245 | 9/1973 | Greco, Sr. | 431/344 |
| 4,182,069 | 1/1980 | DeYoreo | 43/712 |

FOREIGN PATENT DOCUMENTS

| 692662 | 8/1964 | Canada | 126/263 |
|---|---|---|---|
| 0210206 | 12/1982 | Japan | 431/268 |

Primary Examiner—James C. Yeung
Assistant Examiner—Helen Ann Odar
Attorney, Agent, or Firm—Maurice E. Gauthier

[57] ABSTRACT

An apparatus for attracting insects to an insect trapping device. The apparatus includes: a source of combustible fluid; a burner communicating with the fluid source for igniting the fluid in an exothermic reaction generating carbon dioxide, moisture and heat; and a catalyst for catalytically sustaining the reaction.

6 Claims, 7 Drawing Figures

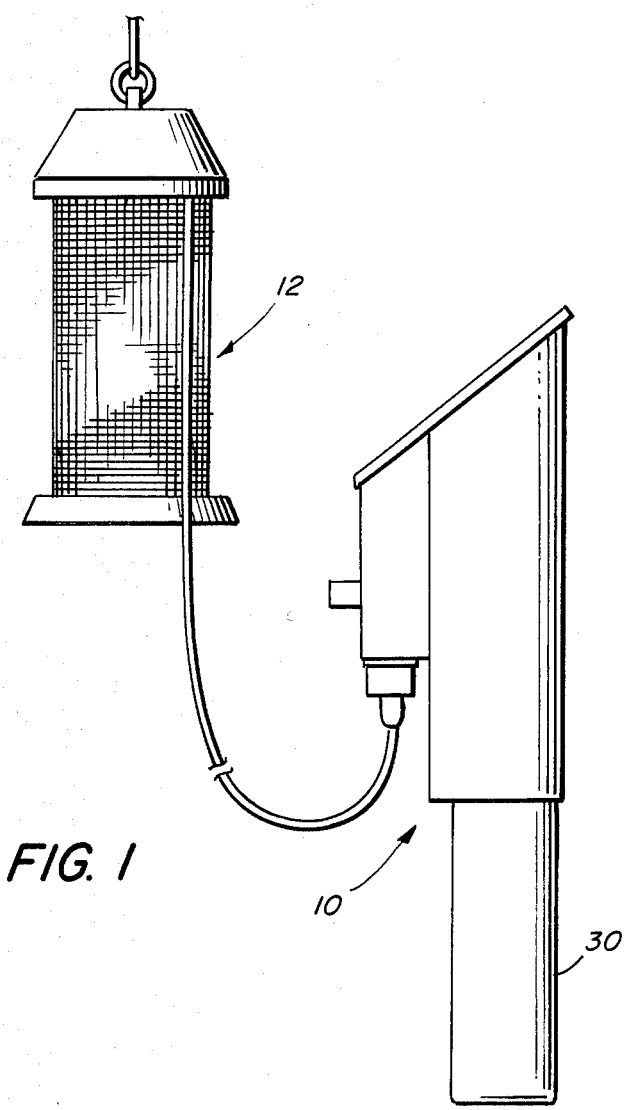
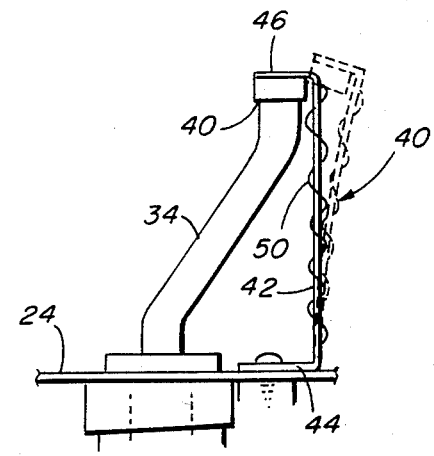
FIG. 1
FIG. 4
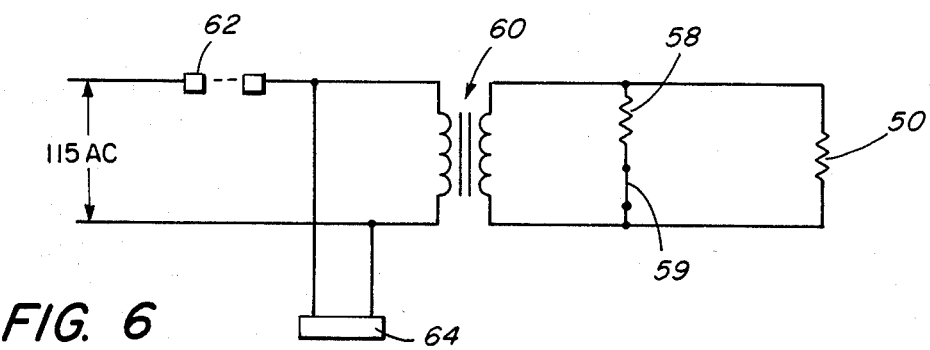
FIG. 6
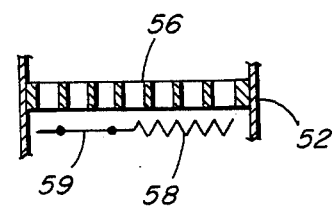
FIG. 5

4,519,776

APPARATUS FOR ATTRACTING INSECTS

BACKGROUND AND BRIEF SUMMARY OF THE INVENTION

The present invention relates to an improved device for attracting mosquitoes to insect trapping devices.

The most popular insect trapping devices currently in use are those which employ ultraviolet light sources to attract mosquitoes into contact with electrically charged killing grids. Experience has indicated, however, that the efficiency of such devices in reducing mosquito populations varies widely depending on a number of factors. For example, during daylight hours, ultraviolet light is largely ineffective as a source of attraction. Moreover, each geographic area has its own complex of mosquito species, some of which are attracted to light only at specific ages. Thus, under certain conditions, the conventional insect trapping devices may be only marginally effective.

The present invention dramatically improves the efficiency of conventional insect trapping devices by adding a second attractive source in the form of a generator designed to produce carbon dioxide, heat and moisture in amounts sufficient to attract a wide variety of mosquito species during both daylight and nighttime conditions. In a preferred embodiment to be described hereinafter in more detail, the generator of the present invention combusts a gaseous fuel in the presence of air in an exothermic reaction which is sustained catalytically. Tests have indicated that the combination of both sources of attraction, i.e., ultraviolet light with carbon dioxide, dramatically increases the number and varieties of trapped mosquitoes.

BRIEF DESCRIPTION OF DRAWINGS

FIG. 1 is a schematic view of one embodiment of a generator in accordance with the present invention shown in combination with a conventional ultraviolet light-type insect trapping devices of the type referred to above;

FIG. 4 is a further enlarged view of the nozzle tube and its associated closure mechanism;

FIG. 5 is a schematic view of the calalytic converter;

FIG. 6 is a circuit schematic; and

BRIEF DESCRIPTION OF PREFERRED EMBODIMENT

Referring to FIG. 1, a generator in accordance with the present invention is shown at 10 positioned in close proximity to a conventional insect trapping device 12. Although not shown, it will be understood that the trapping device 12 includes an ultraviolet light source arranged within an electrically charged killing grid, the latter in turn being contained within an outer open-type protective housing structure.

Figure 2:
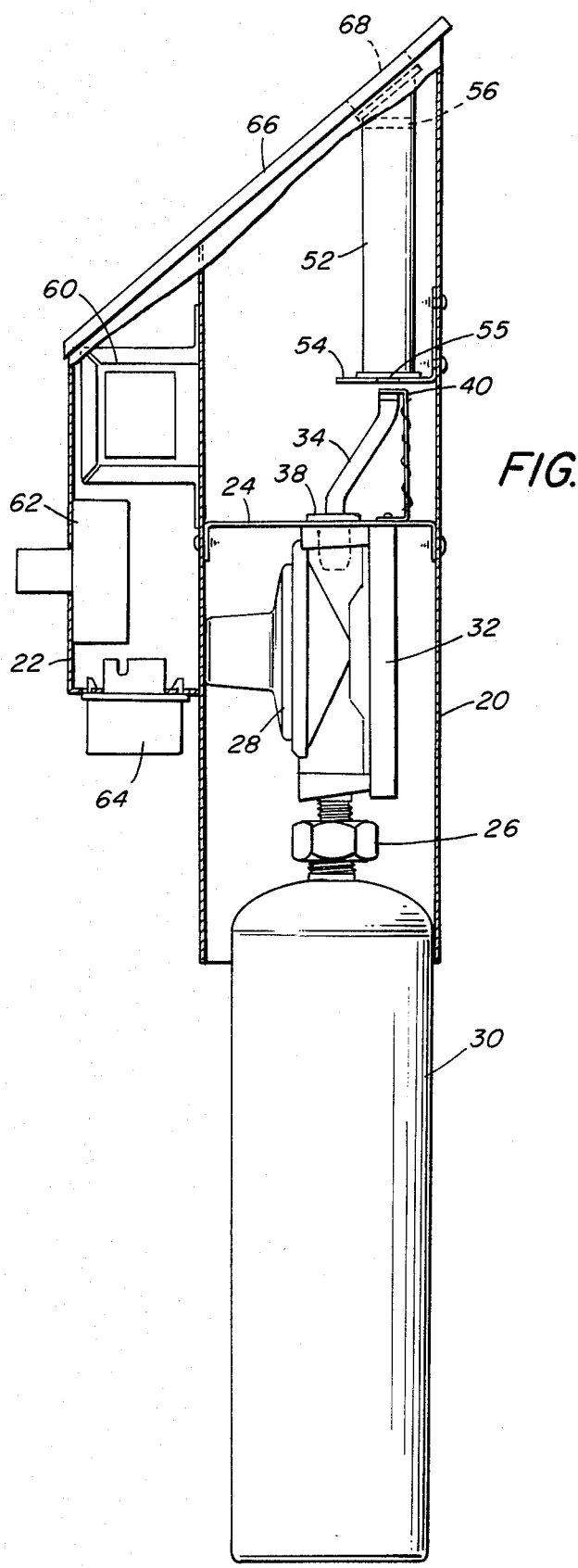
FIG. 2 is a vertical sectional view on an enlarged scale of the generator shown in FIG. 1.
Figure 3:
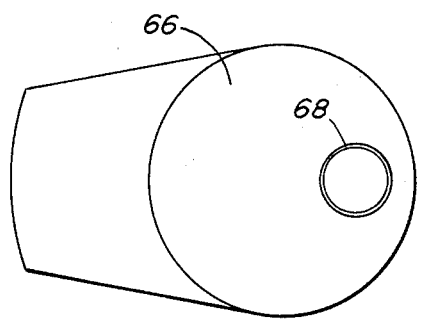
FIG. 3 is a top plan view of the generator of FIG. 2.

In FIGS. 2 and 3 the device 10 is shown in greater detail as comprising a housing 20 in which is disposed a gas regulator 28, the upper end of a gas cylinder 30, a nozzle tube 34 and a burner tube 52. An electrical housing 22 is secured externally to the housing 20.

A valve bracket 24 extends across the interior of the housing 20. The gas regulator 28 is secured to a regulator bracket 32 depending from the bracket 24, with the gas cylinder 30 being removably connected to the regulator as at 26.

The lower end of the nozzle tube 34 passes through the valve bracket 24 and is threaded into the regulator 28. Tube 34 further includes a collar 38 which cooperates with the regulator to engage the bracket 24 therebetween.

A bimetallic strip 40 consisting for example of nickel alloy and chromium alloy, and shown in more detail in FIG. 4, has an elongated body 42 with an inwardly extending base 44 and an inwardly extending upper lip 46, the underside of which carriers closure element 48. The body 22 is wrapped with a current carrying coil 50, and the base 44 is secured to the valve bracket 24. FIG. 4 shows the closure element 48 sealing off the upper end of the nozzle tube 34 to prevent gas from escaping therefrom. If current is applied to the coil 50, the bimetallic strip 40 will be heated and caused to deflect to the position shown by the dashed lines in FIG. 4, thereby unseating the closure element 48 and allowing gas to escape from the nozzle tube 34.

The burner tube 52 is supported on another bracket 54 which also is secured to the interior of housing 20. Bracket 54 has an aperture 55 therein as shown in FIG. 2. It thus will be understood that the gas cylinder 30, the regulator 28, the nozzle tube 34 and the burner tube 52 are connected in series.

As is best shown in FIG. 5, the upper end of burner tube 52 has secured therein a honeycomb shaped catalyst 56 of the type which is supplied for example by Englehard Industries Division of Union, N.J. Adjacent to the catalyst is a hot wire 58. The electrical housing 22 contains a transformer 60 and a photoelectric switch 62, with a standard outlet 64 depending externally therefrom.

With reference to FIG. 6, it will be seen that when the photoelectric switch 62 is closed, the transformer 60 receives its power from a conventional 115 volt electrical AC power source to which the outlet 64 is connected. The transformer 60 steps the voltage down to between 10 to 12 volts and provides the power for the hotwire 58 and the coil 50. A normally closed heat sensitive switch 59 controls current flow through the hot wire 58.

As can be best seen in FIG. 3, the housing 20 is provided with a cover plate 66 having an aperture 68 overlying the upper end of the burner tube 52.

In operation, the switch 62 is closed at dusk, when daylight begins to fail, resulting in current flowing through the coil 50 of the bimetallic strip 40 and through the normally closed switch. The coil 50 heats the bimetallic strip, causing it to deflect, resulting in the closure element 48 being lifted from the end of the tube 34. This allows the gas, typically propane, to flow from the cylinder 30 through the regulator 28 and nozzle tube 34 into the burner tube. Ambient air is drawn into the burner tube 52 by the entering gas flow. The resulting volume of air/gas mixture flowing past the catalyst 56 is in a ratio greater than that which is necessary to completely oxidize the gas into carbon dioxide and water vapor.

With the heat sensitive switch 59 closed, the hot wire 58 will be heated, causing the temperature of the catalyst 56 to be elevated to an operative level of about 700° F. At this temperature, the catalyst ignites the air/gas mixture and sustains an exothermic reaction, resulting in the production of carbon dioxide, heat and moisture. The heat of combustion will cause the switch 59 to open, thereby deactivating the hot wire 58. The reaction will thereafter be sustained catalytically until the photoelectric switch 62 opens, for example at dawn. When switch 62 opens, current flow to coil 50 is interrupted, allowing the bimetallic strip to deflect back to the position shown by solid lines in FIGS. 2 and 4, thus positioning the closure element 48 over the of tube 34 to prevent any further escape of gas therefrom. If for some reason, the catalytic reaction is interrupted while switch 62 is closed, then the switch 59 will close again until the temperature of the catalyst is raised to reignite the air/gas mixture.

The insect trapping device 12 may be connected to the outlet 64, making the operation of both the trapping device 12 and the generator 10 responsive to the opening and closing of photoelectric switch 62.

Figure 7:
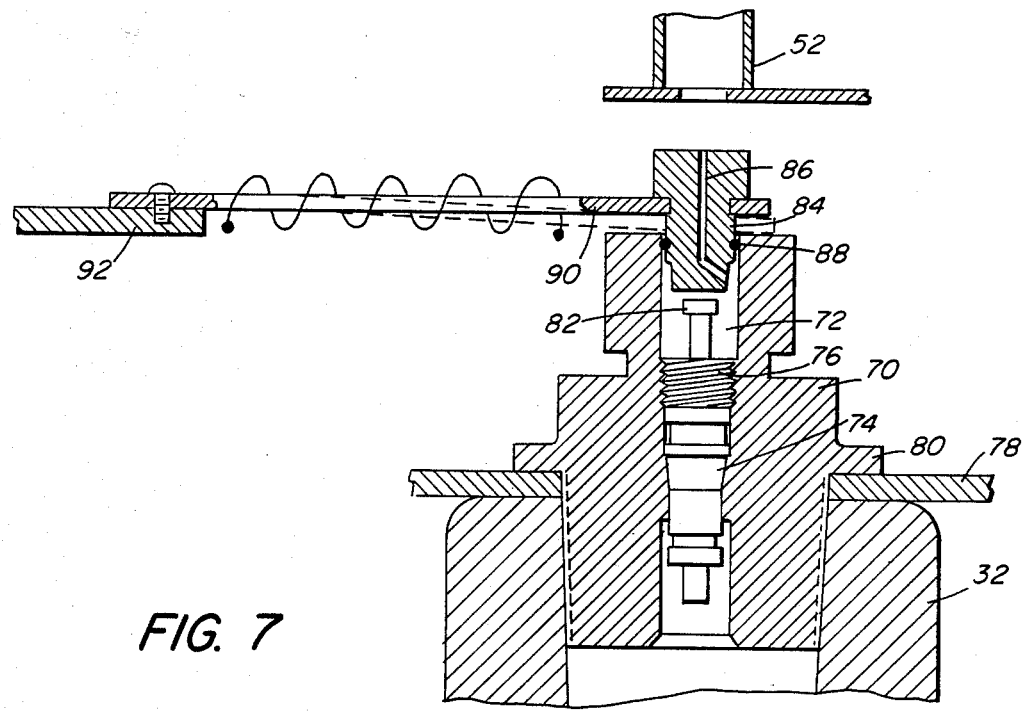
FIG. 7 is a vertical sectional view of an alternate valving arrangement positioned between the regulator and the burner tube.

An alternate embodiment of a valving arrangement is shown in FIG. 7 where a valve body 70 has an axial passageway 72 with a valve core 74 threaded therein as at 76. The valve body extends through an appropriately sized opening in a valve bracket 78 and is threaded into the upper end of the gas regulator 32, with the bracket 78 being held between the regulator and an external circumferential shoulder 80 on the valve body. The valve core 74 may be of any conventional type, for example that identified as Part No. 6181 and supplied by the Shrader Bellows Division of Scovill Manufacturing Company, Akron, Ohio. The valve core 74 has a valve element 82 which is spring-loaded to a raised normally closed position as shown in FIG. 7. When thus closed, the valve element prevents gas from escaping from the regulator 32 through the valve body 74.

A plunger 84 is received in the passageway 72. The plunger 84 has a passageway 86 extending therethrough, and an external groove containing an O-ring 88 which cooperates in sealing engagement with the wall of passageway 72. The plunger 84 is carried on a bimetallic strip 90 similar to the strip 40 of the previously described valve assembly. The strip 90 is fixed as at 92, with a current carrying coil 94 again being associated therewith.

When current is applied to the coil 94, the strip 90 deflects downwardly as shown by the dashed lines in FIG. 7, thus causing the plunger 84 to depress the valve element 82 to an open position allowing gas to flow through the valve body 74 and the plunger passageway 86 into the burner tube 52, the latter being appropriately located to receive the escaping gas and entrained ambient air.

The valve assembly operates on a balance of forces between that exerted by the bimetallic strip 90, which acts to open the valve, and the combination of the force exerted by the valve spring (not shown) and the gas pressure, which coact to close the valve. Under normal gas pressure of approximately ½ pound PSIG, the force exerted by the heated bimetallic strip 90 is sufficient to open the valve. However, in the event of a malfunction of the regulator 32 which would cause full tank pressure (approx. 125 PSIG) to pass into the axial passageway 72, this extra pressure would force the plunger 84 upward, thereby allowing the valve to close. Thus, the valve assembly acts as a second "safety" regulator to prevent an unregulated escape of gas.

EXAMPLE

Field experiments were conducted in a rural-suburban area in Hadley, Mass. Mosquito populations were moderate during the period (June 2–July 30), with enough numbers to provide an adequate test.

Three major experiments were conducted. They were:
1. UV Light Trap* with Propane Flame.
2. UV Light Trap with Infra Red Heat Source
3. UV Light Trap with Propane Flame and Lactic Acid * insect exterminator.

In each experiment, a test unit (light trap with a CO2 generator) was compared to the same type of light trap without a CO2 generator (a control unit). In each experiment three test units and three control units were run simultaneously for 10 nights. The units were positioned in pairs with the units of each pair spaced 30 feet apart. Each of the three unit pairs were positioned so that they did not compete one with the other. The units were hung on poles so that the bottom of each was 4 feet off the ground. Each unit was provided with an underlying collection pan for collecting exterminated insects. The experiment started at 5 pm and terminated at 11 pm each night. At termination all insects killed by each unit were placed in a container and sorted the next day. The numbers of mosquitoes killed by each unit were recorded.

In experiment 1, a standard 80 W Flowtron unit as described in U.S. Pat. No. 4,182,069 was equipped with a CO2 generator so that a very low flame could be produced. The generator was powered by commercially available bottled propane and was attached to the safety grill on the side of the unit. The same arrangement was used in experiment 3, but with the addition of a 4-dram vial of U.S.P. lactic acid (85%) attached by wires to the cover of the CO$_2$ generator so that some of the generator heat warmed the lactic acid vessel. The vessel also contained a dental cotton wick saturated with the liquid and which extended two inches from the vessel to supply more surface area for evaporation.

In experiment 2, a standard 80 W Flowtron unit was again employed, but with one of the 40 W UV bulbs replaced by a 40 W infra-red bulb.

The results of experiment 1 are presented in Table 1. Statistical analysis with "Students T-test for small samples" shows that kills for the test unit with propane-generated carbon dioxide were significantly higher than kills for the standard light trap at p=0.01. If only one of 30 runs did the control unit equal the test unit. During the first 2 days of experiment 1, the traps were set up early in the afternoon (2 pm) to ensure that all facets of the experiment were progressing without problems. As a result all traps were running during daylight hours. Occasional "zaps" indicated that some insects were being killed even in strong sunlight. Upon inspection it was observed that only the test units killed significant numbers of insects, and that the majority of those killed were mosquitoes. An experiment 1A identical to experiment 1 was run entirely during daylight hours. Results are presented in Table 2. The test unit again killed significantly more mosquitoes than the control unit, at p=0.01 with the "Students T-test for small samples".

The results of experiment 2 are presented in Table 3. Analysis revealed that the kill of mosquitoes by the infra red-enhanced test unit did not differ significantly from the standard control unit even at p=0.10 with the "Student's T-test for small samples". Addition of the infra red light source failed to compensate for the loss of UV radiation when the IR bulb replaced the UV bulb.

The results of experiment 3 are presented in Table 4. The $CO_2$ and lactic acid-enhanced test unit again killed significantly more mosquitoes than the control unit. Statistical analysis with the "Student's T-test for small samples" showed significance at $p=0.01$. Since there were higher kills by the enhanced traps, a further daytime experiment was conducted, the results of which appear in Table 5. Again the enhanced test unit had significantly higher kills in daylight than the control unit.

It thus will be seen that the addition of the $CO_2$ generator of the present invention to the UV light trap consistently provided a 2-3 fold increase in mosquito kills over the light trap alone. These dramatic results were not, however, further enhanced by the additional use of lactic acid.

TABLE 1

| Experiment 1: | Mosquito Killing with UV, Heat, $CO_2$ and Humidity |
|---|---|
| Test Unit: | UV(80 W) Light Trap + Propane Flame (= Heat + $CO_2$ + Humidity) |
| Control Unit: | UV (80 W) Light Trap Alone |

| | MOSQUITOES KILLED | |
|---|---|---|
| Date | UV + Heat + $CO_2$ + Humidity | UV Alone |
| VI-2 | 33 | 8 |
| | 14 | 1 |
| | 15 | 4 |
| VI-3 | 21 | 15 |
| | 12 | 11 |
| | 6 | 6 |
| VI-8 | 30 | 8 |
| | 16 | 3 |
| | 10 | 8 |
| VI-9 | 27 | 8 |
| | 5 | 3 |
| | 9 | 5 |
| VI-10 | 19 | 9 |
| | 8 | 6 |
| | 11 | 7 |
| VI-11 | 25 | 11 |
| | 11 | 4 |
| | 10 | 8 |
| VI-12 | 30 | 10 |
| | 13 | 10 |
| | 12 | 5 |
| VI-14 | 21 | 9 |
| | 10 | 6 |
| | 7 | 4 |
| VI-15 | 22 | 6 |
| | 9 | 2 |
| | 8 | 5 |
| VI-17 | 30 | 12 |
| | 10 | 5 |
| | 11 | 7 |
| TOTAL | 465** | 206 |

**Significant at $p = 0.01$ using "Student's T-test for small samples"

TABLE 2

| Experiment 1A: | Daylight |
|---|---|
| Test Unit: | 80 W UV Light Trap + Propane Flame (see previous table) |
| Control Unit: | 80 W UV Light trap |

| | MOSQUITOES KILLED | |
|---|---|---|
| Date | UV + Heat + $CO_2$ + Humidity | UV Alone |
| VI-8 | 4 | 0 |
| | 1 | 0 |
| | 0 | 0 |
| VI-9 | 5 | 1 |
| | 2 | 0 |
| | 1 | 0 |
| VI-10 | 4 | 2 |
| | 0 | 0 |
| | 2 | 1 |
| VI-11 | 2 | 0 |
| | 1 | 0 |
| | 0 | 0 |
| VI-12 | 3 | 0 |
| | 0 | 1 |
| | 1 | 0 |
| VI-14 | 2 | 0 |
| | 2 | 0 |
| | 0 | 0 |
| VI-15 | 0 | 0 |
| | 1 | 0 |
| | 0 | 0 |
| VI-17 | 4 | 1 |
| | 4 | 1 |
| | 2 | 0 |
| TOTAL | 41** | 7 |

**Significant at $p = 0.01$ using "Student's T-test for small samples"

TABLE 3

| Experiment 2: | Mosquito Killing with Infra Red + UV Lights |
|---|---|
| Test Unit: | IR + UV 40 W in Light Trap |
| Control Unit: | UV 80 W Light Trap |

| | MOSQUITOES KILLED | |
|---|---|---|
| Date | IR + (40 W) | UV (80 W) Alone |
| VI-21 | 5 | 6 |
| | 7 | 8 |
| | 4 | 5 |
| VI-22 | 6 | 2 |
| | 5 | 7 |
| | 10 | 4 |
| VI-23 | 4 | 3 |
| | 9 | 6 |
| | 9 | 2 |
| VI-24 | 3 | 6 |
| | 3 | 2 |
| | 4 | 5 |
| VI-25 | 5 | 12 |
| | 11 | 8 |
| | 3 | 6 |
| VI 26 | 7 | 9 |
| | 6 | 4 |
| | 4 | 5 |
| VI-27 | 3 | 6 |
| | 4 | 4 |
| | 4 | 2 |
| VI-28 | 5 | 9 |
| | 3 | 5 |
| | 8 | 6 |
| VI-30 | 7 | 3 |
| | 5 | 6 |
| | 9 | 5 |
| VII-1 | 8 | 5 |
| | 6 | 8 |
| | 4 | 3 |
| TOTAL | 171* | 162 |

*Not significant at $p = 0.10$ (Student's T-test for small samples)

TABLE 4

| Experiment 3: | Mosquito Killing with UV, Heat, $CO_2$, Humidity and Lactic Acid |
|---|---|
| Test Unit: | UV (80 W) Light Trap + Propane Flame + Lactic Acid |
| Control Unit: | UV (80 W) Light Trap Alone |

| | MOSQUITOES KILLED | |
|---|---|---|
| Date | UV + Heat + $CO_2$ + Humidity + Lactic Acid | UV Alone |
| VII-7 | 19 | 10 |
| | 11 | 7 |
| | 12 | 3 |
| VII-8 | 13 | 11 |
| | 9 | 2 |
| | 10 | 4 |

TABLE 4-continued

| | | |
|---|---|---|
| VII-9 | 7 | 0 |
| | 8 | 2 |
| | 4 | 5 |
| VII-12 | 16 | 8 |
| | 11 | 4 |
| | 7 | 3 |
| VII-14 | 21 | 16 |
| | 20 | 4 |
| | 12 | 8 |
| VII-15 | 13 | 8 |
| | 6 | 1 |
| | 7 | 3 |
| VII-16 | 10 | 2 |
| | 4 | 1 |
| | 6 | 0 |
| VII-17 | 11 | 3 |
| | 12 | 2 |
| | 5 | 1 |
| VII-29 | 10 | 5 |
| | 8 | 3 |
| | 9 | 2 |
| VII-30 | 8 | 6 |
| | 7 | 4 |
| | 9 | 1 |
| TOTAL | 305** | 129 |

**Significant at p = 0.01 using the "Student's T-test for small samples"

TABLE 5

| | |
|---|---|
| Experiment 3A: | Daylight |
| Test Unit: | UV (80 W) Light Trap + Propane Flame + Lactic Acid |
| Control Unit: | UV (80 W) Light Trap Alone |

MOSQUITOES KILLED

| Date | UV + Propane Flame + Lactic Acid | UV-Alone |
|---|---|---|
| VII-7 | 3 | 0 |
| | 1 | 0 |
| | 2 | 0 |
| VII-8 | 2 | 1 |
| | 0 | 1 |
| | 1 | 0 |
| VII-9 | 0 | 0 |
| | 0 | 0 |
| | 0 | 0 |
| VII-12 | 3 | 1 |
| | 1 | 0 |
| | 3 | 0 |
| VII-14 | 0 | 0 |
| | 0 | 1 |
| | 0 | 0 |
| VII-16 | 0 | 0 |
| | 0 | 0 |
| | 0 | 0 |
| TOTAL | 16** | 4 |

**Significant at p = 0.01 using "Student's T-test for small samples"

Although the invention has been described with the use of propane, any fluid medium may be used which upon combustion will produce carbon dioxide and this includes hydrocarbon gases such as butane, methane, etc. Further, modifications to the generator are within the scope of the invention, such as using different catalysts, other types of switches, different valving mechanisms, different housing arrangements, etc.

The preferred embodiment has been described with reference to a cylinder of propane being partially received within the sleeve. However, the source of combustible fluid can be a standard five (5) gallon tank external of the sleeve and connected to the regulator by a suitable hose. In lieu of the photo-sensitive switch, which is self actuating at dusk, a standard on-off switch maybe used. The exterminator and generator can be powered separately and need not be serially connected.

Power also can be supplied by portable electric sources, including A.C. generators, batteries, etc.

Having described the invention what is now claimed is:

1. An apparatus for attracting insects to an insect trapping device, said apparatus comprising:
   enclosure means defining an interior chamber with inlet and outlet openings communicating therewith;
   a catalyst arranged in said chamber;
   a source of pressurized combustible fluid;
   means including a normally closed valve for connecting said source to said inlet opening;
   a first electrically operable means for opening said valve to thereby permit combustible fluid to flow from said source via said inlet opening into said chamber;
   a second electrically operable means for heating said catalyst to an elevated temperature at which said catalyst ignites the combustible fluid in said chamber and thereafter sustains an exothermic reaction, thereby producing a mixture of carbon dioxide and moisture which exists from said chamber via said outlet opening, said second electrically operable means comprising an electric heating element arranged in said chamber adjacent to said catalyst; and
   a normally closed electric switch connected in series with said electric heating element, said switch being of the type which opens at said elevated temperature.

2. An apparatus for attracting insects to an insect trapping device, said apparatus comprising:
   enclosure means defining an interior chamber with inlet and outlet openings communicating therewith;
   a catalyst arranged in said chamber;
   a source of pressurized combustible fluid;
   means including a normally closed valve for connecting said source to said inlet opening;
   a first electrically operable means for opening said valve to thereby permit combustible fluid to flow from said source via said inlet opening into said chamber;
   a second electrically operable means for heating said catalyst to an elevated temperature at which said catalyst ignites the combustible fluid in said chamber and thereafter sustains an exothermic reaction, thereby producing a mixture of carbon dioxide and moisture which exits from said chamber via said outlet opening, said second electrically operable means comprising an electric heating element arranged in said chamber adjacent to said catalyst;
   a normally closed electric switch connected in series with said electric heating element, said switch being of the type which opens at said elevated temperature; a transformer of the type adapted to be powered by an AC power source; and
   means for connecting said first and second electrically operable means inparallel with said transformer.

3. An apparatus for attracting insects to an insect trapping device, said apparatus comprising:
   enclosure means defining an interior chamber with inlet and outlet openings communicating therewith;
   a catalyst arranged in said chamber;

a source of pressurized combustible fluid;

means including a normally closed valve for connecting said source to said inlet opening;

a first electrically operable means for opening said valve to thereby permit combustible fluid to flow from said source via said inlet opening into said chamber;

a second electrically operable means for heating said catalyst to an elevated temperature at which said catalyst ignites the combustible fluid in said chamber and thereafter sustains an exothermic reaction, thereby producing a mixture of carbon dioxide and moisture which exits from said chamber via said outlet opening;

a transformer of the type adapted to be powered by an A.C. power source; and means for connecting said first and second electrically operable means inparallel with said transformer.

4. An apparatus for attracting insects to an insect trapping device, said apparatus comprising:

enclosure means defining an interior chamber with inlet and outlet openings communicating therewith;

a catalyst arranged in said chamber;

a source of pressurized combustible fluid;

means including a normally closed valve for connecting said source to said inlet opening;

a first electrically operable means for opening said valve to thereby permit combustible fluid to flow from said source via said inlet opening into said chamber;

a second electrically operable means for heating said catalyst to an elevated temperature at which said catalyst ignites the combustible fluid in said chamber and thereafter sustains an exothermic reaction, thereby producing a mixture of carbon dioxide and moisture which exits from said chamber via said outlet opening, said second electrically operable means comprising an electric heating element arranged in said chamber adjacent to said catalyst;

a transformer of the type adapted to be powered by an AC power source; and means for connecting said first and second electrically operable means in parallel with said transformer.

5. The apparatus in accordance with any one of the preceding claims wherein said first and second electrically operable means are connected in parallel to a common transformer which is powered by an AC power source.

6. The apparatus according to anyone of claims 1-4 further comprising a photoelectric switch connected in series between said power source and said transformer, said photoelectric switch being of the type which is closed in the absence of light.

* * * * *